Sept. 12, 1967  A. REIMBERT  3,341,090
MEANS FOR DISCHARGING PULVERULENT OR GRANULAR
MATERIALS FROM SILOS
Filed Nov. 22, 1965
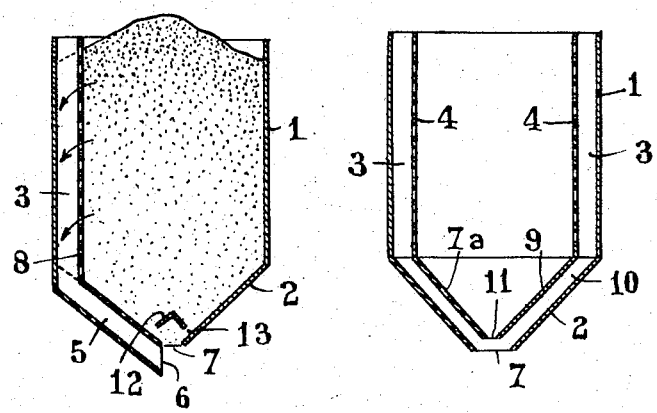
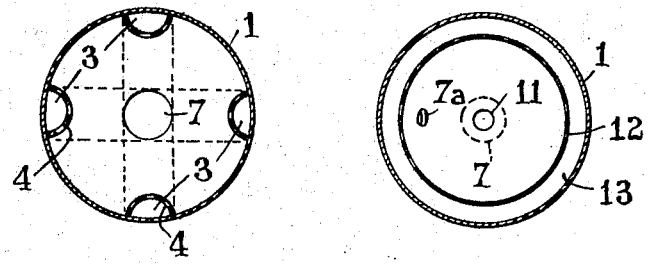

United States Patent Office 3,341,090
Patented Sept. 12, 1967

3,341,090
MEANS FOR DISCHARGING PULVERULENT OR GRANULAR MATERIALS FROM SILOS
André Reimbert, 67 Blvd. de Reuilly, Paris, France
Filed Nov. 22, 1965, Ser. No. 511,580
Claims priority, application France, Nov. 21, 1964, 995,842
9 Claims. (Cl. 222—464)

ABSTRACT OF THE DISCLOSURE

A silo comprising a first wall and a second wall disposed within the first wall concentric therewith and defining with the second wall an annular first space, the second wall defining within itself a second space and being provided with at least one aperture communicating with both of the spaces, both walls having lower ends respectively defining a first and a second outlet communicating with the first and second spaces, and the first outlet concentrically surrounding the second outlet.

---

The method of discharging hopper-type silos containing pulverulent or granular materials which consists in utilizing at least one vertical perforated discharge tube extending substantially throughout the height of the silo and called "antidynamic tube" has been known for many years. This tube is advantageous in that it ensures the quiet discharge of the silo from the top downwards. The manner in which this system operates is well known; assuming that the silo and the antidynamic tube are filled with grain, for example, and that the antidynamic tube has its discharge end opening above or beneath the discharge aperture of the hopper, when this aperture is opened (and also the lower aperture of the tube, if any closing or valve means are provided thereat), firstly only the grains contained in the tube fall to the outside, for the tube is so designed and disposed in relation to the hopper aperture that the lower layers of grains are retained in the silo by a wedging effect as a function of the angle of friction of the material which is subordinate to the pressure applied thereto by the bulk of the grains overlying these lower layers.

As the grains contained in the antidynamic tube flow to the outside, the perforations formed in said tube become gradually free from the upper portion of the tube downwards, and the grains in the silo which at any moment overlie these perforations can penetrate therethrough into the tube and then flow to the outside. This process continues until the pressure applied to the grains previously locked above the discharge aperture has dropped sufficiently to permit the outflow of these grains through this aperture. However, to make this discharge structure effective, the dimensions of the tube perforations must be so calculated as to provide for the grains, as they flow out from the assembly, and therefore as the tube perforations are gradually cleared, a bearing sufficient to cause said grains to remain stationary as long as their angle of repose is not concerned by the grain level in the antidynamic tube.

From the foregoing it is clear that the grains flow regularly and gradually from the top of the silo through said antidynamic discharge tube, and it is substantially only the portion contained in the hopper that flows directly through the discharge aperture thereof and simultaneously, if the case may arise, with the material still contained in the lower portion of the antidynamic tube. Finally, whether the discharge is complete or partial, it is obvious that the different layers of grains are always gradually discharged from top to bottom without receiving any stirring action. Now in certain cases it is advantageous, during the discharge operation, to mix the various layers superposed in the silo, or in other words, to apply a stirring effect thereto during their discharge.

This result is obtained by applying the method of this invention which, in the case of silos for the storage of pulverulent or granular materials and equipped with at least one perforated discharge tube of the antidynamic tube type, comprises means for causing the siloed material to flow simultaneously into said perforated discharge tube through the tube perforations registering with the layers of siloed material which lie at different levels in the silo, thus ensuring an efficient stirring of the superposed layers.

Thus a homogenizing effect particularly desirable for many industrial processes is obtained. The means contemplated hereinabove consist in causing from the onset the rapid evacuation of the discharge tube or tubes filled with the siloed material in order rapidly to clear the perforations to be utilized simultaneously.

This discharge can take place whether the discharge tube or tubes open directly to the outside or into the discharge aperture of the hopper, by providing for the outlet apertures cross-sectional dimensions sufficient to ensure the desired output. Of course, instead of a single perforated discharge tube a plurality of such tubes may be used, and other modifications may also be contemplated as will appear as the following description proceeds with reference to the accompanying drawing illustrating diagrammatically by way of example a few typical forms of embodiment of this invention. In the drawing:

FIGURE 1 is an axial section showing a silo pro-equipped with a lateral perforated tube closed along its portion adjacent the inner wall of the silo;

FIGURE 2 is a plane view showing a modified form of embodiment comprising four tubes of the type illustrated in FIGURE 1, and FIGURES 3 and 4 are respectively a vertical section and a plane view of a silo equipped with a perforated discharge sleeve mounted inside the silo and adjacent the inner wall thereof.

The silo structure illustrated in FIGURE 1 comprises a lateral wall of the silo 1 merging into a hopper 2 and at least one lateral perforated discharge tube 3. In this construction it is assumed that the discharge tube consists of a vertical perforated wall 4 engaging with its lateral edges the inner wall of the silo, said tube having its lower end connected to a bent portion 5 running along the outer wall of the hopper and opening at 6 just under the discharge aperture 7 of the hopper. However, it is obvious that this bent portion 5 may also be mounted against the inner wall of the hopper instead of the outer wall thereof, so that the undesired perforation of the hopper may be avoided. Of course, the discharge tube 3 has perforations 8 formed substantially throughout its vertical height and these perforations have dimensions sufficient to permit the flow of siloed material into the tube during the discharge process simultaneously through all the perforations, as a consequence of the lateral pressure exerted by the upper layers. These dimensions and/or the number of these perforations may if desired increase gradually towards the lower end of the tube in order to take due account of the reduction in the lateral pressure tending to force material into the tube as the silo is being discharged.

In FIGURE 2 the arrangement comprises four discharge tubes 3 spaced 90 degrees from each other in the silo 1 and consisting like the tube 3 of FIGURE 1 of a perforated vertical wall 4 engaging with its side edges the inner wall of the silo. These tubes, whether of same or unequal heights, may also comprise a bent lower non-perforated extension disposed along the hopper of the silo and opening tangent to the discharge aperture 7 thereof.

On the other hand, these tubes may also open directly into another hopper 9 disposed inside the first hopper 2 of silo 1 and spaced therefrom by a gap 10 of constant or variable width but sufficient in any case to permit the proper operation of the antidynamic tubes 3. The second hopper 9 comprises a discharge aperture 11 opening into the discharge aperture 7 of the main hopper 2 of the silo, and if desired this second hopper may also comprise holes 7a of which the distribution and shape are consistent with each specific type of material to be siloed. The hopper 2 may also comprise holes 7a opening into the external tube 5, and if the tube 5 is mounted inside the hopper these holes 7a are formed in the tube wall. In certain cases the hopper 2 and also the second hopper 9 may be provided with a conical cap 12 overlying the apertures 7 and 11 so as to provide a free gap 13 more or less important according to the characteristics of the siloed material and the throughput to be obtained by means of these apertures.

If desired, a modified form of embodiment of the structure illustrated in FIGURE 3 may be contemplated which consists in substituting an inner perforated cylindrical wall 12 for the discharge tubes 3, a gap 13, serving the same purpose as the tubes, being left between this cylindrical wall 12 and the outer wall 1 of the silo. In this case the material may be discharged either through the separate holes formed at spaced intervals in the lower portion of the silo (not shown), or through a second hopper such as the complementary hopper 9 of FIGURE 3. This wall 12 may also be frusto-conical, with the small base of the cone at the top or at the bottom, according to the type of discharge contemplated.

Irrespective of the specific form of embodiment selected among those described hereinabove and illustrated diagrammatically in the attached drawing, and also in the case of other constructions involving different shapes and positions of the perforated tubes and/or walls, it will be readily understood by anybody conversant with the art that the desired result, that is, the simultaneous discharge through all the tube perforations, can be obtained by selecting for the final discharge one or more hopper discharge apertures of such dimensions and position that they will facilitate the rapid initial evacuation of all the materials contained in the perforated discharge tubes such as the conventional antidynamic tubes utilized to this end, and which may be located at positions other than the lateral ones illustrated, for example a central position in relation to the silo, or in the perforated annular discharge sleeve.

Besides, the silo proper may have any desired cross-sectional contour, such as circular, or polygonal.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What I claim is:

1. A silo comprising a first cylindrical wall and a second cylindrical wall disposed within said first cylindrical wall and concentric therewith and both walls being continuous and defining an annular first space, said second wall defining within itself a second space and being provided with at least one aperture communicating with both of said spaces, both of said walls being continuous and having lower ends respectively defining a first and a second outlet communicating with said first and second spaces, and said first outlet concentrically surrounding said second outlet.

2. A silo as defined in claim 1, wherein both of said walls have respective lower portions which taper conically in downward direction.

3. A silo as defined in claim 2, wherein said aperture is provided in an upper portion of said second wall.

4. A silo as defined in claim 2, wherein said aperture is provided in the lower portion of said second wall.

5. A silo as defined in claim 2, wherein said first and second outlets are located at different levels.

6. A silo as defined in claim 2, wherein said second outlet is located at a level above said first outlet.

7. A silo as defined in claim 6, wherein said inner wall is provided with a plurality of additional apertures at least the majority of which are located in the upper portion of said second wall.

8. A silo as defined in claim 7, wherein said silo has a top and bottom and wherein the cross-sectional area of said apertures increases in correspondence with the increasing proximity of the respective aperture to said bottom of said silo.

9. A silo as defined in claim 2; and further comprising a downwardly diverging substantially conical member located within the confines of said second wall in the proximity of said second outlet upwardly spaced therefrom.

References Cited

UNITED STATES PATENTS

| | | | |
|---|---|---|---|
| 407,907 | 7/1889 | Sprague | 259—180 |
| 413,720 | 10/1889 | Henderson | 214—17 |
| 1,605,070 | 11/1926 | Rockburg | 214—16 |
| 2,903,166 | 9/1959 | Kuljian | 222—478 |
| 2,907,501 | 10/1959 | Laird | 193—29 X |
| 3,029,986 | 4/1962 | Horn et al. | 222—464 X |
| 3,035,739 | 5/1962 | Berg | 222—564 X |
| 3,094,243 | 6/1963 | Haugen | 222—1 |
| 3,225,944 | 12/1965 | Reimbert | 214—17 |
| 3,233,796 | 2/1966 | Reimbert | 224—464 |

FOREIGN PATENTS

| | | |
|---|---|---|
| 532,633 | 9/1931 | Germany. |

RAPHAEL M. LUPO, *Primary Examiner.*